(12) United States Patent
Roberts

(10) Patent No.: US 11,572,987 B2
(45) Date of Patent: Feb. 7, 2023

(54) PORTABLE ELEVATED LIGHTING SYSTEM

(71) Applicant: Jack Roberts, Big Bear Lake, CA (US)

(72) Inventor: Jack Roberts, Big Bear Lake, CA (US)

(73) Assignee: Silent Night Inc., Big Bear Lake, CA (US)

( * ) Notice: Subject to any disclaimer, the term of this patent is extended or adjusted under 35 U.S.C. 154(b) by 0 days.

(21) Appl. No.: 17/485,450

(22) Filed: Sep. 26, 2021

(65) Prior Publication Data
US 2022/0333746 A1 Oct. 20, 2022

Related U.S. Application Data

(60) Provisional application No. 63/176,705, filed on Apr. 19, 2021.

(51) Int. Cl.
| | |
|---|---|
| *F21L 4/04* | (2006.01) |
| *F21V 21/22* | (2006.01) |
| *F21L 4/08* | (2006.01) |
| *F21V 29/76* | (2015.01) |
| *F21W 131/105* | (2006.01) |
| *F21Y 115/10* | (2016.01) |

(52) U.S. Cl.
CPC ............... *F21L 4/04* (2013.01); *F21L 4/08* (2013.01); *F21V 21/22* (2013.01); *F21V 29/767* (2015.01); *F21W 2131/105* (2013.01); *F21Y 2115/10* (2016.08)

(58) Field of Classification Search
CPC .... F21L 4/04; F21L 4/08; F21V 21/22; F21V 29/767
See application file for complete search history.

(56) References Cited

U.S. PATENT DOCUMENTS

| | | | |
|---|---|---|---|
| 3,381,118 A | 4/1968 | Widner | |
| 4,220,981 A | 9/1980 | Koether | |
| 5,207,747 A | 5/1993 | Gordin et al. | |
| 7,637,636 B2 * | 12/2009 | Zheng | F21V 29/83 362/373 |
| 7,976,187 B2 * | 7/2011 | Villard | F21V 3/04 362/249.02 |
| 8,072,123 B1 | 12/2011 | Han | |
| 8,342,709 B2 * | 1/2013 | Lueken | F21V 29/75 362/240 |
| 8,342,714 B1 * | 1/2013 | Rea | H01J 61/523 362/264 |
| 8,439,534 B1 | 5/2013 | Roe et al. | |

(Continued)

*Primary Examiner* — Arman B Fallahkhair
(74) *Attorney, Agent, or Firm* — Kirk A. Buhler; Buhler & Associates Patenting

(57) ABSTRACT

Improvements a portable elevated lighting system that uses LED lighting elements for illumination. The LED lights are selected based upon the light transmission angle so the fewest number of lighting elements are needed to provide an even flood or focus of light from the system. A reflector works as a heat sink to remove heat from the LED lights and extend the operation life of the LED's. Thermal paste and or a thermal pad is used between the LED lighting element and the frame to conduct sufficient heat away from the LED element. Two versions are shown as a stadium light and as a circular flood light that provides lighting without shadows or bright areas. The system can be operated from a generator or solar for charging batteries so the lighting can operate self-contained without producing noise.

11 Claims, 4 Drawing Sheets

(56) References Cited

U.S. PATENT DOCUMENTS

| | | | |
|---|---|---|---|
| 8,690,391 B2 * | 4/2014 | Drake | F21V 11/183 |
| | | | 362/264 |
| 8,833,985 B2 | 9/2014 | Robertson et al. | |
| 9,039,231 B1 | 5/2015 | Barker et al. | |
| 9,581,303 B2 * | 2/2017 | Gordin | F21V 21/30 |
| 9,791,118 B2 * | 10/2017 | Carpoff | F21S 9/043 |
| 9,955,553 B2 | 4/2018 | Fletcher | |
| 10,145,544 B2 * | 12/2018 | Gowanlock | E21B 15/00 |
| 10,330,284 B2 * | 6/2019 | Gordin | F21V 17/02 |
| 10,794,551 B2 | 10/2020 | Flesch et al. | |

\* cited by examiner

PORTABLE ELEVATED LIGHTING SYSTEM

CROSS REFERENCE TO RELATED APPLICATIONS

This application claims the benefit of Provisional Application Ser. No. 63/176,705 filed Apr. 19, 2021 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in portable elevated lighting system. More particularly, the present portable elevated lighting system creates a safety lighting for construction and roadwork, recreation lighting for RVs and campsites, boutique event lighting and specialty event lighting. The lighting helps provide a safe campground and can supplement a communal campfire or replace it when fires are prohibited.

Description of Related Art Including Information Disclosed Under 37 CFR 1.97 and 1.98

In the evenings or nights there is a need to provide lighting so activities can continue when there is no natural light. This requires illumination from a fire or from powered illumination when access to city power is not available. Often the location where the lighting is required is at a location such as a desert, mountain, athletic field or a highway. Sometimes the lighting is only needed for a limited amount of time, so a temporary and portable lighting system needs to be moved to the desired location. A power supply will need to be connected or integrated with the lighting elements and the lighting elements should be as efficient as possible to extend the operating life from the power supply. The lighting should also be designed to provide illumination to a particular area or be evenly distributed around the elevating structure. For most lights there is a need to dissipate heat from the lighting elements to increase the longevity of the lighting elements.

A number of patents and or publications have been made to address these issues. Exemplary examples of patents and or publication that try to address this/these problem(s) are identified and discussed below.

U.S. Pat. No. 4,220,981 issued on Sep. 2, 1980, to Herbert F. Koether and is titled Portable Floodlighting Equipment. This patent discloses a portable floodlighting unit of the type having an extensible mast mounted on a vehicular body for transportation and collapsible into a horizontal position on the body is provided with two collapsible masts at diagonally opposite corners of the vehicle. Each mast is provided with a frame carrying a battery of floodlights. While this patent provides a portable lighting unit, lighting is only provided in one direction from the vehicular body.

U.S. Pat. No. 8,439,534 issued on May 14, 2013, to George Michael Roe et al., and is titled Mobile Lighting Apparatus. This patent discloses a mobile lighting apparatus includes a portable frame such as a moveable trailer or skid having a light tower thereon. The light tower is moveable from a stowed position to a deployed position. A hydrogen-powered fuel cell is located on the portable frame to provide electrical power to an array of the energy efficient lights located on the light tower. This mobile unit also only provides lighting in one direction and relies on a hydrogen-powered fuel cell.

U.S. Pat. No. 8,833,985 issued on Sep. 16, 2014, to Daniel Lee Robertson et al., and is titled Mobile Solar-Powered Light Tower. This patent discloses a mobile lighting device that can derive power from a renewable energy source, such as solar power. The device can comprise a mobile base unit that can house one or more components of the device. The device further can comprise a solar power module associated with the mobile base unit that converts solar energy into electrical current. While the lighting can be charged from solar panels it does not offer alternative power sources or LED lighting.

U.S. Pat. No. 9,039,231 issued on May 26, 2015, to Page Barker et al. and is titled Hybrid Light Tower System. This patent discloses a hybrid light tower provides a way to connect a light tower to one of a shore power connection, such as 120V AC or a generator supported by a housing on an axle through a relay. While this patent discloses LED lighting and multiple power sources, lighting is only provided in a single direction and the lighting head does not provide a reflective heat sink.

What is needed is a portable elevated lighting system that can be easily installed to provide directed illumination or 360-degree illumination with the reflector operating as a heat sink. The proposed portable elevated lighting system provides the solution.

BRIEF SUMMARY OF THE INVENTION

It is an object of the portable elevated lighting system to use LED lighting elements for illumination. The use of LED lights provides high levels of illumination efficiently. The LED lights used can be known as cluster lights where a high number of LED elements are place in close proximity. The LED lights are selected based upon the light transmission angle so the fewest number of lighting elements are needed to provide an even flood or focus of light from the system.

It is an object of the portable elevated lighting system to utilize a heat sink to remove heat from the LED lights and extend the operation life of the LED's. Thermal paste and or a thermal pad is used between the LED lighting element and the frame to conduct sufficient heat away from the LED element. The heatsink thickness is also selected based upon the expected amount of heat that will be generated.

It is another object of the portable elevated lighting system to use a mast with a reflector. The reflector is single sided to provide even lighting to just one side of the base or can be designed to provide even lighting 360-degrees around the support post. This provides lighting without shadows or bright areas. The circular lighting uses five lighting elements placed around a support post to evenly illuminate in all directions below the reflector.

It is still another object of the portable elevated lighting system to operate or be charged from a variety of different sources including, but not limited to solar, battery and a generator. The lighting system can charge batteries so illumination is provided without any sound that might be generated from a gas-powered generator. The system is self-contained and portable so it can be quickly deployed and removed as needed to illuminate an area.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
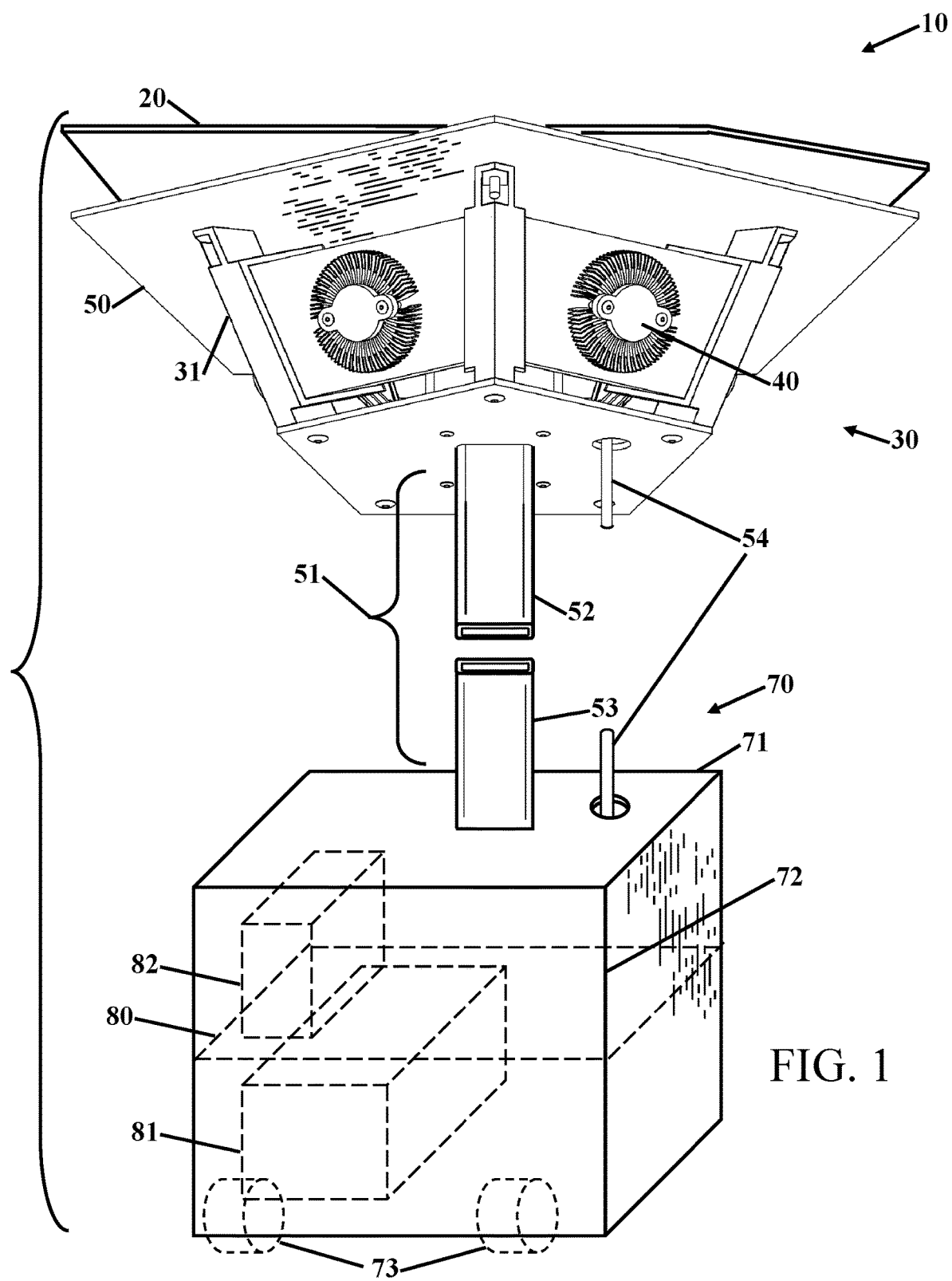
FIG. 1 shows a perspective view of a portable elevate 360-degree lighting system.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

| Item Numbers and Description |
|---|
| 10 portable elevated lighting system |
| 20 solar panel |
| 30 360-degree head |
| 31 side wall |
| 32 inner wall |
| 33 emission angle |
| 34 overlap |
| 35 mounting face |
| 36 reflection angle |
| 37 corner |
| 38 angle |
| 40 LED light |
| 40L left LED light |
| 40R right LED light |
| 41 LED |
| 42 resistor |
| 43 hole |
| 44 solder pad |
| 45 cooling fins |
| 46 cover |

| Item Numbers and Description |
|---|
| 48 thermal paste |
| 49 fastener |
| 50 cap |
| 51 riser |
| 52 upper post |
| 53 lower post |
| 54 electrical conductors |
| 55 heat sink |
| 56 joiner |
| 58 mounting hole |
| 59 rear post |
| 60 stadium head |
| 61 brim |
| 62 wall |
| 63 pivot |
| 64 removable pin |
| 70 base |
| 71 base housing |
| 72 door |
| 73 wheel(s) |
| 80 shelf |
| 81 generator |
| 82 battery |
| 90 angles sides |

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise.

It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters.

FIG. 1 shows a perspective view of a portable elevate 360-degree lighting system 10 with the 360-degree head 30 at the upper portion of the figure and a base 70 at the lower portion of the figure. A riser 51 is shown in the middle of the figure where the riser 51 connects into the upper post 52 in the 360-degree head 30 and into a lower post 53 in the base 70. The length of the riser 51 is selected based upon the installation. The length of the riser 51 could be several feet long the get the top of the 360-degree head 30 above people or could be over 20 feet tall, or more, to allow the lighting from the 360-degree head 30 to spread over a greater area for a longer field of illumination.

The riser 51 can be a telescoping pole or constructed from multiple male/female sections of pipe or tubing that are sequentially connected together to set or adjust the height of the 360-degree head 30 to the base 70. Electrical conductors 54 pass between the riser 51 and the connecting elements between the 360-degree head 30 and the base 70. In this embodiment the electrical conductors 54 pass outside of the riser 51, but could also pass within the riser. The electrical conductors 54 could be a coiled conductor or could be spooled within either (or both) if the head 30 or base 70.

This figure shows the 360-degree head 30 with a solar panel 20 on the top of the 360-degree head 30. The solar panel 20 allows for collecting solar energy in the day that charges one or more batteries. The stored power in the battery (ies) 82 can power the portable elevated lighting system 10 in the evenings or night. A gas-powered generator 81 can also, or alternatively be used to charge the battery (ies) 82 as well as charging the batteries from an outlet. The gas-powered generator 81 and battery (ies) 82 are retained within the base housing 71 and are secured therein behind a door 72. The base 70 is shown as a base housing 71 with an internal shelf 80, but other sizes, shapes and configurations of the base 70 are contemplated. It is further contemplated to include outrigger legs on the base housing 71 and or ballast to stabilize the base 70 from or accidental tipping. It is also contemplated to include wheels 73 or other apparatus to allow the portable elevated lighting system 10 to be more easily moved or transported and moved or adjusted.

The 360-degree head 30 shows as a five-sided head with angled side walls 31. The top of the 360-degree head 30 has a cap 50 that operates as a light deflector. LED lights 40 are mounted to each of the five-side wall 31. The side walls 31 and the cap 50 are constructed as a single aluminum unit to conduct heat from the LED lights 40 to cool the LED lights 40. A transformer, power regulator or batteries could be installed or mounted to the 360-degree head 30. Electrical wiring 54 that runs from the base 70 and through the riser 51 tubes connect to each of the LED lights 40.

Figure 2:
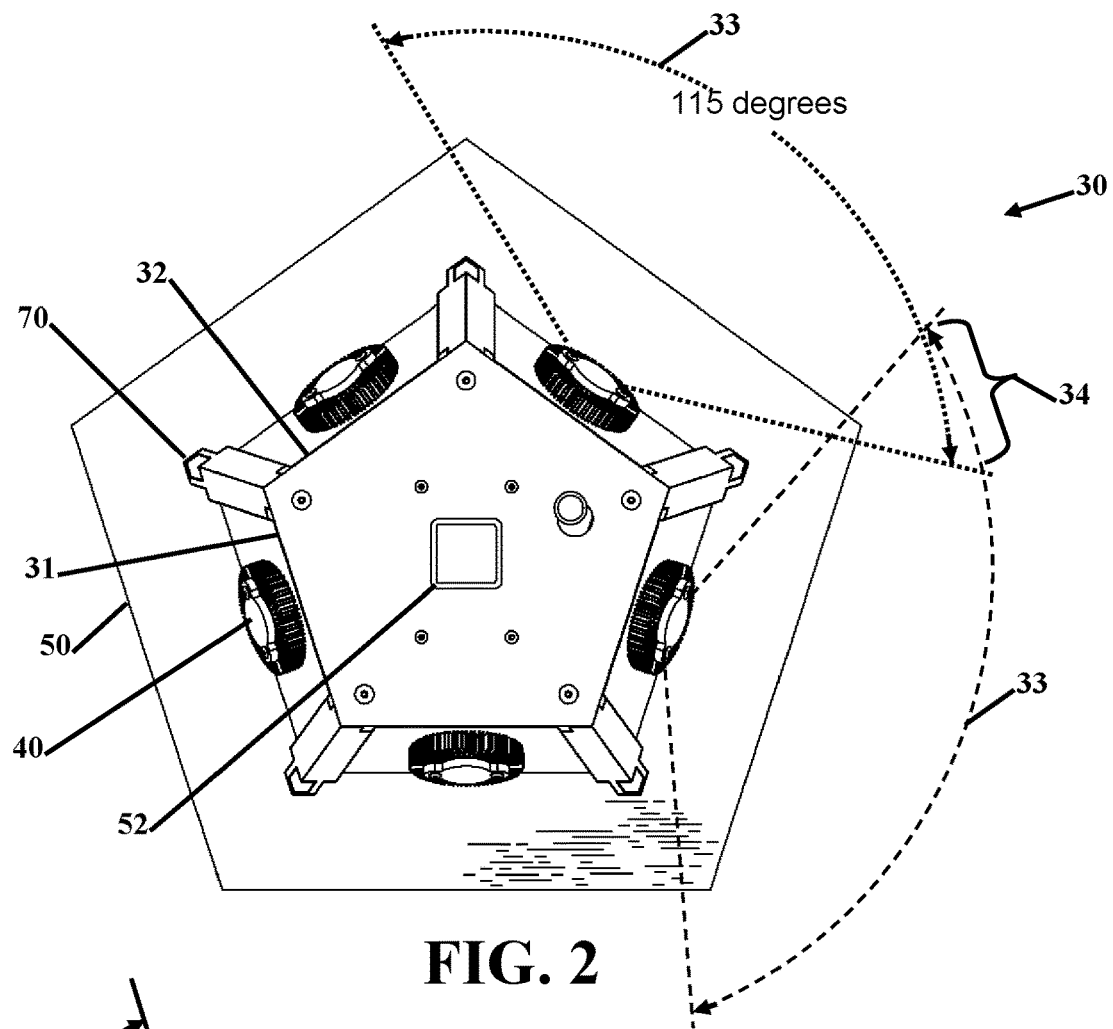
FIG. 2 shows a bottom view of the head of the 360-degree lighting system.

FIG. 2 shows a bottom view of the head of the 360-degree lighting system 30. The sidewall 31 is formed as a five-sided shape with the walls being angled at 72 degrees. The sidewalls 31 are also angled from the base 70. The angle from the sidewalls 31 to the base 70 is shown and described in other figures herein. The cap 50 is also five-sided and provides some environmental protection as well as an upper reflective surface. Within the side wall 31 is the inner wall 32. LED light(s) 40 are centered and secured to the side wall(s) 31. The LED light(s) 40 are secured with fasteners and have thermal paste or a thermal pad that increases heat transfer from the LED light(s) 40 to the side wall 31.

Each LED light 40 has a light emission angle 33 of about 115 degrees. While an angle of 115 degrees is provided, smaller or larger light emission angles are contemplated provided there is some overlap 34 of the light from LED lights on adjacent sides of the five-sided side wall 31. While a five-sided structure is disclosed, structures of more than five-sides could be used, based upon the light emission angle 33. Structures with four-sides will have some variation in the lighting in some areas around the structure due to the light emission angle with light overlapping.

Figure 3:
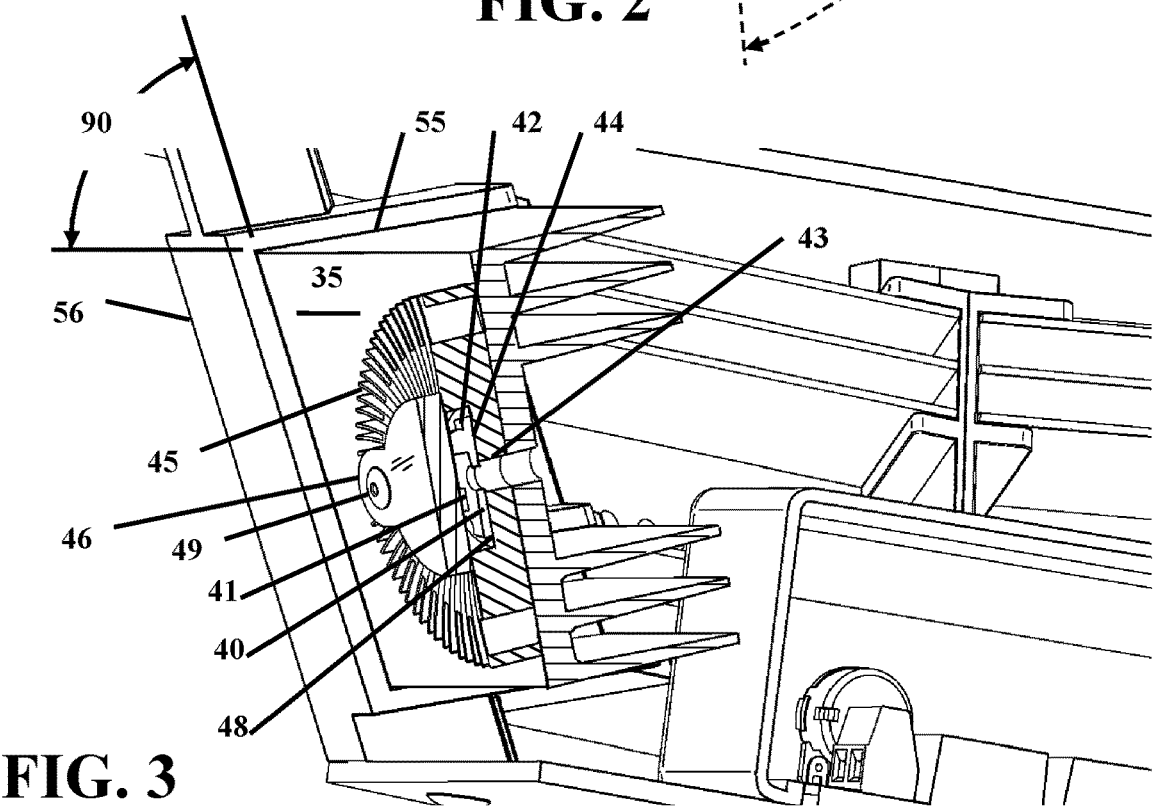
FIG. 3 shows a detail view of the LED lighting element.

FIG. 3 shows a detail view of the LED lighting element of the LED light 40. This figure shows only one of the LED lighting elements, but the LED lighting elements on all of the sides are the same. The LED light 40 includes three (or more or less) separate LED's 41 or cluster light emitting diode (LED). In this example one or more currently limiting resistors 42 are shown. While three LEDs 41 and two resistors 42 are shown as few as one LED and no current limiting resistors could be more than three LED's and more than two resistors. A central hole 43 is provided for wiring to pass through the LED light 40, where the wiring is soldered to solder pad(s) 44. A cooling fins 45 heat sink surrounds the LED light 40 and a transparent cover 46 protects the assembly.

The LED light is secured to the mounting face 35 of the lighting head with fasteners 49. This figure also shows thermal paste 48 that transfers heat from the LED's and circuit board to the mounting face 35. While thermal paste 48 is shown, thermal pads could equally be used to transfer heat. Thermal paste could also be placed under the heads of the fastener 49. In the preferred embodiment, brass screws are used as the fasteners 49 to further increase heat transfer. The mounting face(s) 35 are formed from sections of heatsink 55 material with angled joiners 56. A top of each heat sink 55 is wider than a bottom of each heatsink 55 whereby each of the heat sinks 55 is an isosceles trapezoid have angled sides 90 whereby creating a downward angle from vertical of each of said five separate LED lighting elements 40 and joining the angled sides 90 provides lighting around the riser 51 as seen in the bottom view of FIG. 2. This method of construction allows for easily increasing or decreasing the number of light transmission surfaces by changing the angle joiners 56 as well as changing the length of the heatsink to change the head diameter.

Figure 4:
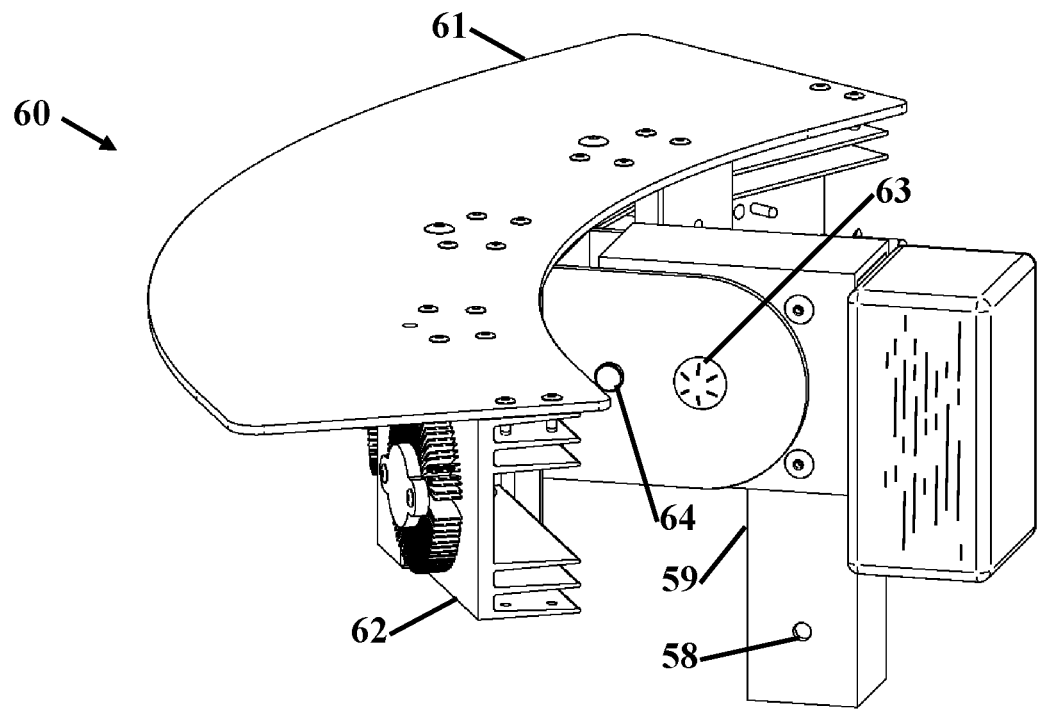
FIG. 4 shows a top perspective view of a stadium light.

FIG. 4 shows a top perspective view of a stadium head 60 light. The stadium head 60 shines light in essentially one direction or up to 180 degrees. The stadium head 60 has a rear post 59 so the riser will be located behind the light being emitted. One or a plurality of mounting holes 58 are shown to mount the stadium head 60 to a riser. The front of the stadium head 60 has a curved wall 62 that is made from multiple straight heat sinks with angled connectors, but the curved wall could also be stepped to provide a flat mounting surface(s) for one, two, three, four or more LED light (not shown). The stadium head 60 also has a brim 61 the reflects light downward. The stadium head 60 joins to the post 59 with a pivot 63 connection that allows for the angle of the stadium head 60 to be adjusted. A spring-loaded pin 64 fits into a hole to lock the rotational angle of the stadium head 60 in finite angles. While a removable pin 64 is shown and described this can also be done with a friction plate a spring-loaded pin through a plurality of holes or the like.

Figure 5:
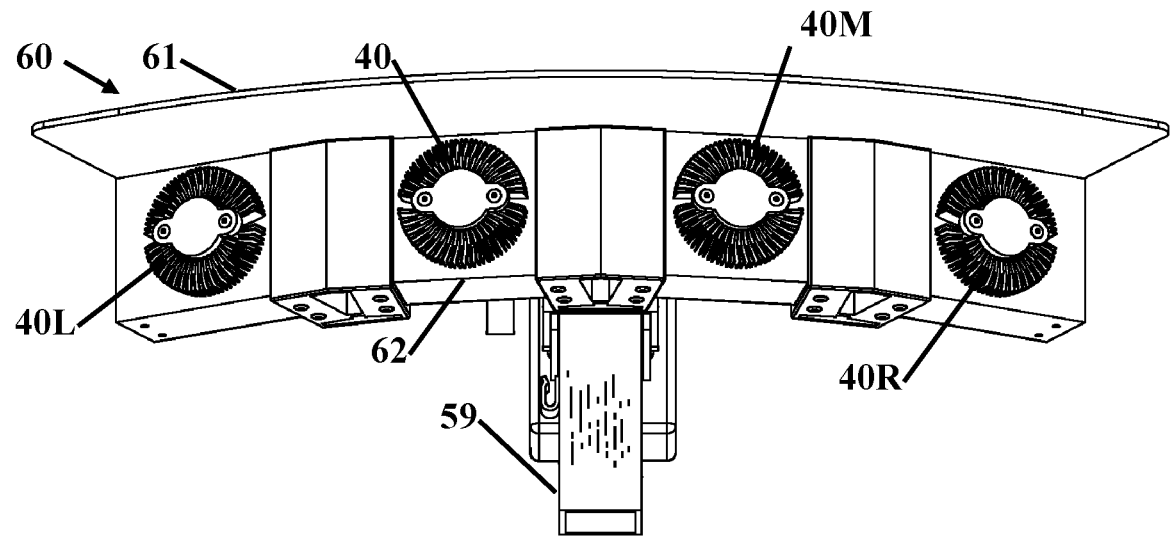
FIG. 5 shows a lower perspective view of the stadium lighting head.

FIG. 5 shows a lower perspective view of the stadium head 60 lighting head. The stadium head 60 in this figure shows four sets of LED light 40, 40L, 40M and 40R and some of the LED lights could be optional based upon the required illumination and the angle of light transmission. A portion of the rear post 59 can be seen in this figure. At this rotated angle, the brim 61 is shown on the curved (or segmented) wall 62 where the LED lights are mounted to spread the lighting in a broad horizontal area to provide lighting only away from the stadium head 60. This view shows the removable pin 64 and the frictional pivot 63 with a knob that is manually loosed and tightened for the downward angle adjustment of the stadium head 60.

Figure 6:
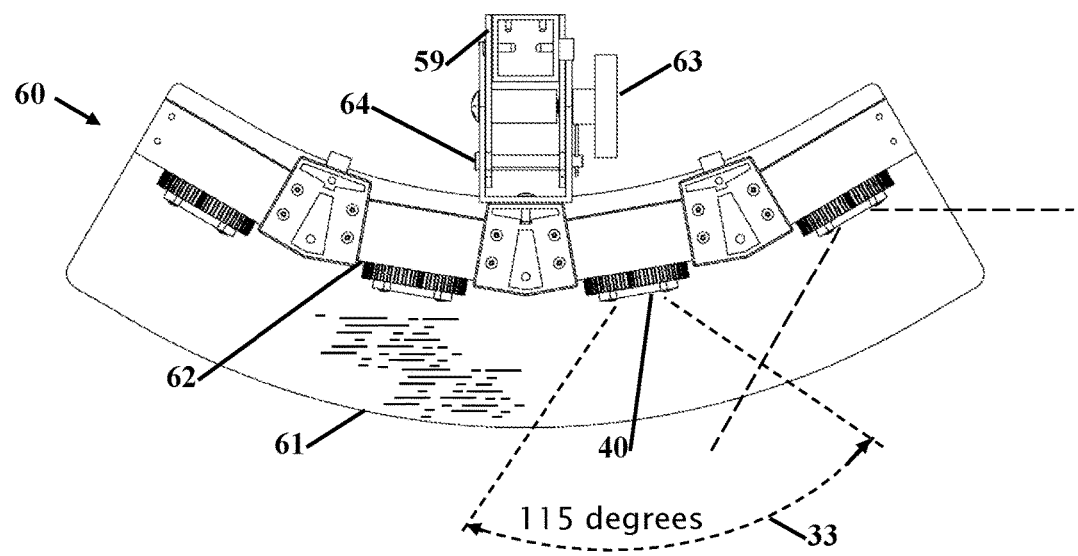
FIG. 6 shows a bottom view of the stadium lighting head that shows the light transmission range.

FIG. 6 shows a bottom view of the stadium head 60 lighting that shows the light transmission angle 33 range. The light from a single LED light 40 provides a lighting angle of about 115 degrees, and proper placement of four LED lights 40 would provide an essentially 180-degree spread of light. Other or a different number of LED lights 40 are contemplated to provide a light transmission angle of 90-degrees to 180-degrees. The LED lights 40 are mounted to the heat sink wall 62 that is secured to the reflective brim 61. The rear of the wall 62 is secured to the rear post 59 where wiring is routed down a riser.

Figure 7:
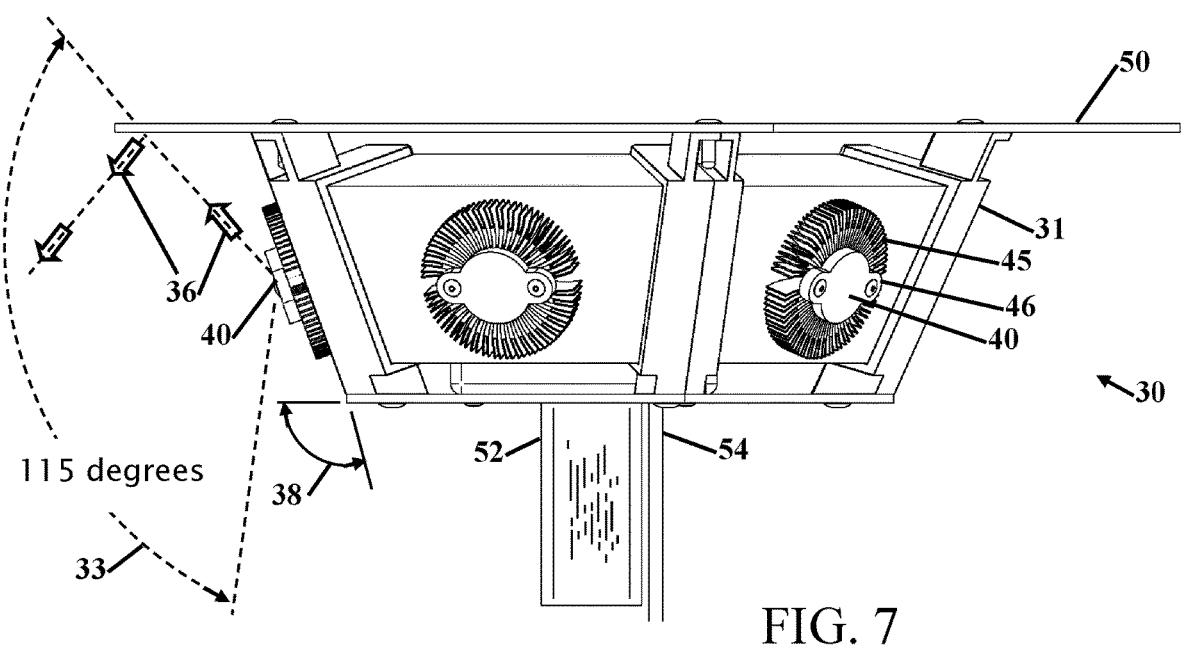
FIG. 7 shows a side view of the 360-degree lighting head showing the light transmission range.

FIG. 7 shows a side view of the 360-degree head 30 lighting head showing the light transmission range. From this side view the light emission angle 33 of about 115 degrees is shown. The angle 38 of the side wall 31 is tipped slightly about 15 degrees downward so the LED light 40 shines nearly straight down, and some of the light from the LED light 40 that is sent upward towards the cap 50 has a reflection angle 37 that bounces this light downward. The cap 50 is mounted by welding or the like to the upper post 52. This figure shows the cover 46 on the outside of the heatsink cooling fins 45. This figure also shows the electrical conductor 54 extending adjacent to the upper post 52.

The light systems shown and described in this document provides safety lighting for construction and roadwork, recreation lighting for RVs and campsites, boutique event lighting and specialty event lighting. The lighting helps provide a safe campground and can supplement a communal campfire or replace it when or where fires are prohibited to allow safe illumination.

Thus, specific embodiments of a portable elevated lighting system have been disclosed. It should be apparent, however, to those skilled in the art that many more modifications besides those described are possible without departing from the inventive concepts herein. The inventive subject matter, therefore, is not to be restricted except in the spirit of the appended claims.

SEQUENCE LISTING

Not Applicable.

The invention claimed is:

1. A portable elevated lighting system comprising:
a base housing having an internal rechargeable power source;
said base housing having a riser that extends from a top of said base housing;
said riser having an upper end that is secured to a lighting head;
said lighting head having at least one LED lighting element;
said at least one LED lighting element having five separate lighting LED lighting elements angled at 72-degree intervals around said riser, wherein each separate LED lighting element is mounted on its own isosceles trapezoid shaped heat sink;
said isosceles trapezoid shaped heat sinks being connected on their outer sides by joiners that connect five of said isosceles trapezoid shaped heat sinks together thereby forming a five-sided lighting head that provides a lighting around said riser;
a top of each said isosceles trapezoid shaped heat sink being wider than a bottom of each said isosceles trapezoid shaped heat sink whereby each of said isosceles trapezoid shaped heat sinks having angled sides whereby when said angled sides of said isosceles trapezoid shaped heat sinks are connected with said joiners a downward angle of light transmission from said riser from each of said five separate LED lighting elements is emitted.

2. The portable elevated lighting system according to claim 1, wherein said five-sided lighting head has a cap that reflects at least some light from said LED lighting element downward around said riser.

3. The portable elevated lighting system according to claim 2, further includes a solar panel mounted on top of said five-sided lighting head.

4. The portable elevated lighting system according to claim 1, wherein each of said at least one LED lighting elements is secured to a finned heat sink that is secured to each or said plurality of isosceles trapezoid shaped heat sinks to dissipate heat from said at least one LED lighting element.

5. The portable elevated lighting system according to claim 4, wherein said at least one LED lighting element is covered by a lens cover that is secured though said finned heat sink into said isosceles trapezoid shaped heat sink.

6. The portable elevated lighting system according to claim 1, wherein said internal rechargeable power source is a battery.

7. The portable elevated lighting system according to claim 6, wherein said battery is charged with a solar cell and/or a gas-powered generator.

8. The portable elevated lighting system according to claim 1, wherein said riser has an adjustable length to elevate said lighting head.

9. The portable elevated lighting system according to claim 1, further includes an extendable electrical conductor between said base housing and said lighting head.

10. The portable elevated lighting system according to claim 1, wherein each of said LED lighting element has said light transmission angle of 115 degrees.

11. The portable elevated lighting system according to claim 1, wherein said five-sided lighting head is formed such that said light transmission is angled at 72 degrees from said riser.

* * * * *